Nov. 20, 1923.
L. M. COOPER
WIRE SPOKED WHEEL
Filed March 26, 1920
1,474,405
2 Sheets-Sheet 1
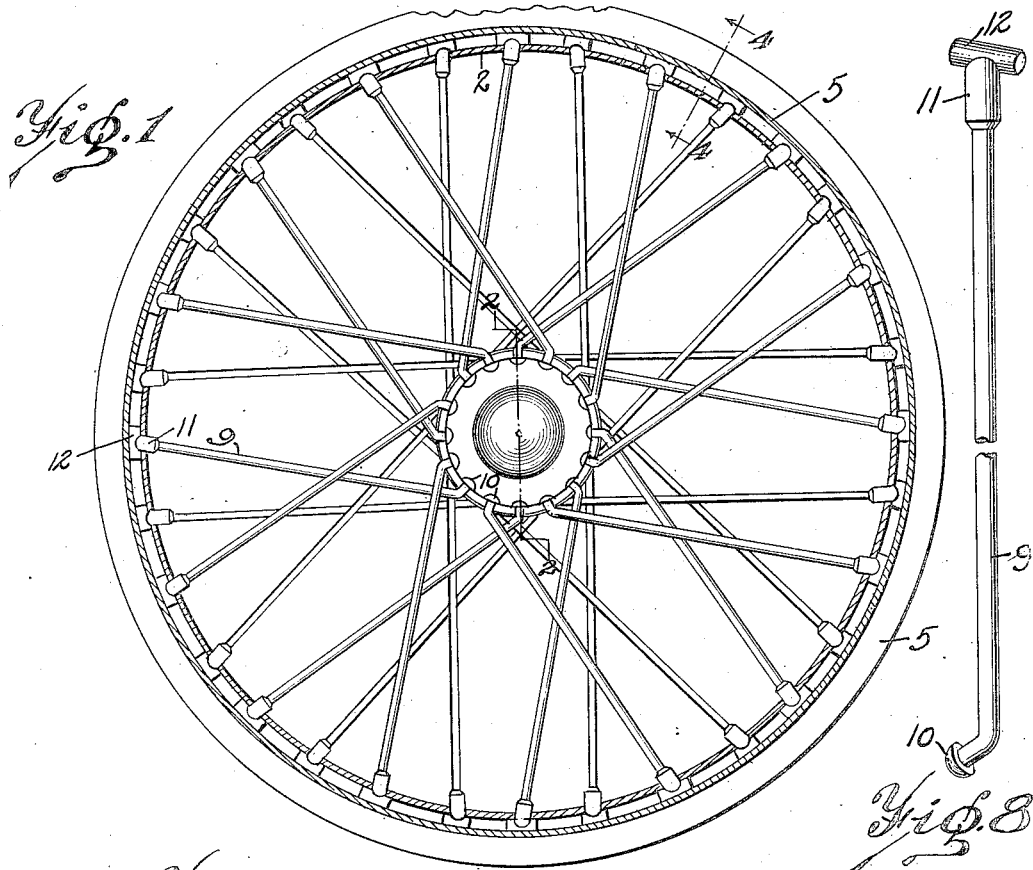
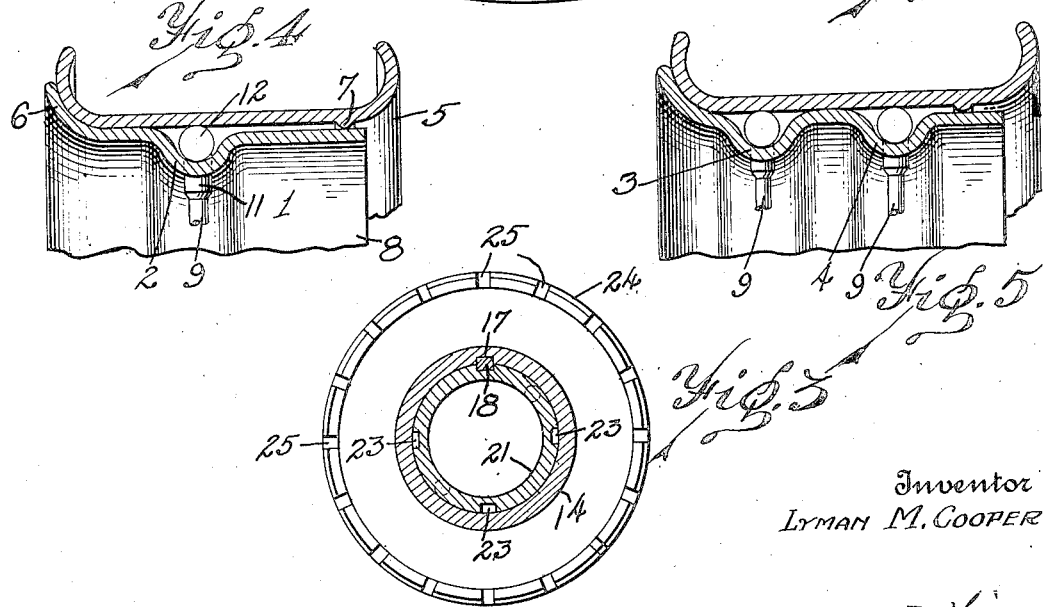
Inventor
LYMAN M. COOPER
By Charles E. Wiener
Attorney

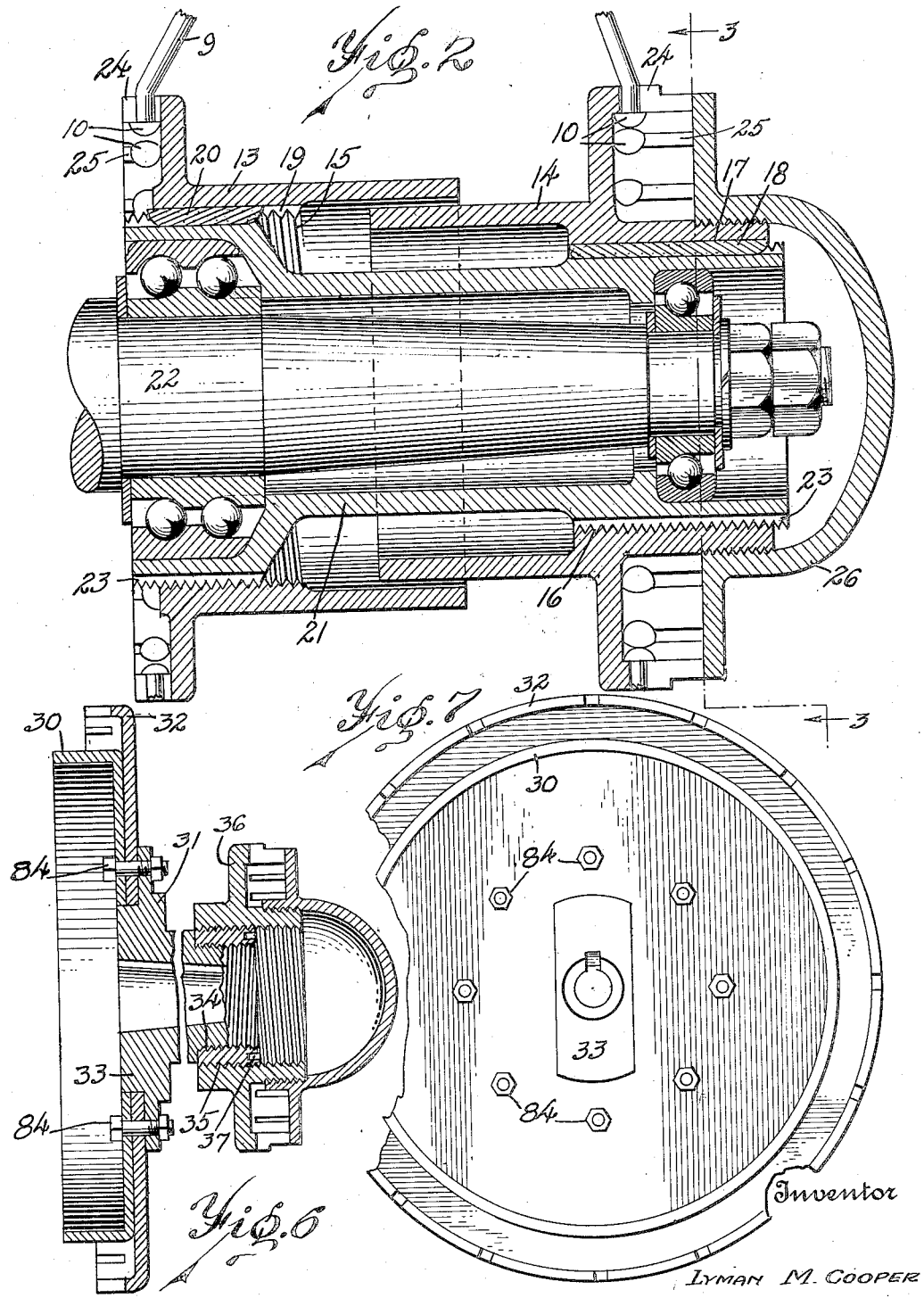

Patented Nov. 20, 1923.

1,474,405

UNITED STATES PATENT OFFICE.

LYMAN M. COOPER, OF DETROIT, MICHIGAN, ASSIGNOR OF ONE-HALF TO CHARLES E. WISNER, OF DETROIT, MICHIGAN.

WIRE-SPOKED WHEEL.

Application filed March 26, 1920. Serial No. 368,819.

*To all whom it may concern:*

Be it known that I, LYMAN M. COOPER, a citizen of the United States, residing at Detroit, county of Wayne, State of Michigan, have invented a certain new and useful Improvement in Wire-Spoked Wheels, and declare the following to be a full, clear, and exact description of the same, such as will enable others skilled in the art to which it pertains to make and use the same, reference being had to the accompanying drawings, which form a part of this specification.

This invention relates to wire spoked wheels, and the primary object of the invention is to provide a wire spoked wheel and hub in which each spoke is a single part headed at each end, the construction of the rim and hub permitting the insertion of the spoke through an aperture in the rim to engagement with a socket provided in the hub flange, the tip of the spoke at the rim having a T head and the rim being constructed to permit the head to rock on its seat, and further to provide a hub construction expansible and contractible transversely of the plane of the wheel whereby the spokes may be drawn uniformly taut thereby securing a perfectly balanced wheel. A further object is to secure a hub construction in which the hub members are in telescopic relation permitting expansion and contraction without exposure of the interior of the hub. In securing this result a two-part hub is provided each having a flange notched to receive a set of spokes and the construction being of a character in which an adjusting device having a right and left hand threaded portion is utilized to expand and contract the hub proper. A feature of this invention resides in the provision of the right and left hand threaded adjusting member, the right threaded portion engaging one of the flanged portions of the hub and the left hand threaded portion engaging the other flanged portion of the hub.

These and other objects and the several novel features of the construction of the invention are hereinafter more fully described and claimed, and the preferred form of construction embodying my invention is shown in the accompanying drawings in which—

Fig. 1 is an elevation of a wire spoked wheel embodying my invention.

Fig. 2 is an enlarged longitudinal section taken on line 2—2 of Fig. 1 of a hub showing the two flanged portions thereof in telescopic relation and controlled in position through the use of a right and left hand threaded adjusting member.

Fig. 3 is a cross section on a reduced scale taken on line 3—3 of Fig. 2.

Fig. 4 is a cross section of the rim taken on line 4—4 of Fig. 1 showing the seat for the T headed spoke.

Fig. 5 is a similar view of a rim of a slightly different form of construction.

Fig. 6 is a vertical longitudinal section of a wheel hub showing a slightly different type of right and left hand threaded adjusting member.

Fig. 7 is a side elevation of the hub and brake drum as shown in Fig. 6, partly broken away.

Fig. 8 is a detail of a spoke.

Preferably, the wheel is provided with spokes extending substantially on a tangent to the periphery of the hub flange each set of spokes being crossed as is the general practice and preferably the rim 1 is provided with a circumferential groove 2 as shown in Fig. 4 or with grooves 3 and 4 as shown in Fig. 5. In the construction here shown the rim is provided with a demountable tire carrying rim 5 and this rim may be of any desired type. Preferably, the wheel rim 1 is provided with an upturned flange 6 on the inner side against which an upturned portion of the tire rim engages. Near the outer flange of the tire rim 5 and on the inner side of the said rim is provided an annular rib 7 and the outer side 8 of the wheel rim 1 is slightly less in diameter than the flanged side 6. The rib 7 engages over this portion 8 and spaces the wheels rims 1 and 5 substantially as shown.

The grooves 2 or 3 or 4 are apertured to receive the spokes 9 and this aperture is of a size to permit the inner headed end 10 of the spoke to pass therethrough, the shank 11 of the T head portion being substantially of the same diameter as the headed end 10. The spoke is inserted through the aperture at the rim and when so inserted the shank 11 rests in and practically fills the aperture therefor while the cross portion 12 of the T head lies in the groove with the longitudinal axis thereof in the plane of the groove. This T head riding in the groove as for instance shown in Fig. 4, will permit the oscillation of the head by movement of the inner end of the spoke in a direction longitudinally of the wheel axis and the apertures in which the shank 11 engage are of sufficient size to permit such slight oscillation.

The hub as shown in Fig. 2, is designed for use on the front wheel of an automobile or such wheels as are not driving wheels of a vehicle. This hub is quite similar in construction to that shown in my former U. S. Patent No. 1,119,403, of Dec. 1, 1914, and involves the flanged portion 13 and a flanged portion 14, the cylindrical parts of which are substantially in telescopic relation as shown. The portion 13 is internally threaded with right hand threads 15 as shown while the portion 14 has a left hand threaded part 16. As is shown in Fig. 3, the portion 14 has a keyway 17 provided therein for a key 18 and the part 13 is similarly provided with a keyway 19 in which a key 20 may be positioned as shown in Fig. 2. In threaded engagement with these two threaded portions 15 and 16 is a cylindrical adjusting member 21 having corresponding threads at each end for the respective hub portions and this member 21 is shaped to carry the bearing rings of the anti-friction bearings as will be understood from Fig. 2. The spindle 22 of the axle is supported by these bearings and the member 21 is therefor revoluble on this spindle. Due to the fact that the two flanged hub members 13 and 14 are secured to the rim by means of spokes as hereinafter more fully described, they are held from rotation and therefore rotation of this adjusting member 21 having the right and left hand threaded relationship with the respective hub members causes the said hub members to move in one direction or the other longitudinally of the axis of the hub, it being understood that the keys are of a character to be removed to permit rotation of the adjusting member 21 relative to the hubs. As is shown in the said Fig. 3 the hub adjusting member may be provided with several longitudinal grooves 23 adapted to be turned to registration with the groove 17 of the hub member and insertion of the key in either or both the hub members prevents rotation of the adjusting member 21. For this purpose only one end of the adjusting member may be keyed to the respective hub member which will easily prevent relative rotation of the adjusting member.

The flanges of the portions 13 and 14 are each provided with a cylindrical part 24 which is notched as indicated at 25 into which notches the spoke ends may be inserted with the heads 10 in the interior of the cylindrical portion as will be understood from Fig. 2.

When the wheel is to be assembled the two hub portions 13 and 14 by turning of the member 21 are brought closely together and the spokes are inserted through the rim aperture as before stated and the inner ends positioned in the slots provided in the respective hub members, there being a set of spokes for each hub member, the spokes of said sets being in alternate relation at the rim. When the spokes have been positioned with the inner ends in the respective hub members, rotation of the adjusting member 21 causes the said members 13 and 14 to move in opposite directions longitudinally of the axis of the hub causing uniform tension on the spokes and forcing the rim to occupy a plane centrally between the two hub members. After the spokes have been drawn sufficiently taut the key 18 may be inserted and a cap 26 positioned over the outer end as shown in Fig. 2 enclosing the hub end.

In the form of construction shown in Fig. 4 both sets of spokes from each hub flange are connected substantially to the center plane of the wheel rim but, by means of the construction shown in Fig. 5 for instance, the sets of spokes may extend to a groove for each set and the wires extending from one side of the wheel flange may extend to the opposite side of the wheel rim and thus be crossed if desired. In fact any character of wheel lacing may be employed in this construction as may be found desirable, either a straight spoke or a spoke extending to a tangent as shown, the requirement being that a seat in the rim should be provided for the T heads of the spokes and a notched hub provided to receive the opposite ends of the spokes.

In the construction shown in Fig. 6 the same result is achieved as in the construction shown in Fig. 2. The construction in Fig. 6, however, is best adapted for use on the driving wheel of automotive vehicles. With such driving wheels is employed a brake drum 30 which is keyed to the spindle of the axle. The flange 32 for the spokes at the inner end of the hub member may be bolted to a flange of the hub member 31 and preferably this hub member is provided with an extending substantially rectangular member 33 and both the spoke flange 32 and the disc of the brake drum 30 should be apertured to engage over this rectangular portion 33 so that the strain incidental to application of the brake or to the normal driving of the wheel is not applied directly to the bolts 34 for holding the members in assembled relation.

Where a brake drum is to be used, it is evident that the flange or portion of the hub to which it is applied must be in a fixed position longitudinally of the axle to continually lie within the encircling band (not here shown) to be applied to the drum. Therefore, in order to apply the construction of the right and left hand threaded adjusting member, I provide the outer end of the member 31 with a right hand threaded portion 34 to receive an adjusting member 35 internally right hand threaded and externally left hand threaded and on this external left hand threaded portion is the outer portion 36 of the hub carrying a flange notched to receive the spokes in the same general manner as shown in Fig. 2. The adjusting member 35 is provided with recesses 37 for a spanner wrench whereby the same may be turned and due to the fact that the hub end 36 is held from rotation through the connection of the spokes therewith, rotation of the adjusting member due to the right and left hand threaded construction described carries the member 36 inwardly or outwardly longitudinally of the axis of the hub to loosen or tighten the spokes. This member 35 is to be understood as being provided with a keyway and preferably may be keyed to the inner hub member 31 in the same manner as described relative to the key relationship of the hub member and adjusting member of Fig. 2. By this latter construction the principle of operation of the device is secured as is the case in Fig. 2 and the loosening or tightening of the spoke does not alter the relationship of the brake drum in its position relative to the brake band that is to be understood as being positioned thereabout.

By the construction described a wheel that is neat in appearance and simple in construction is secured and that is readily repaired in case of the breakage of a spoke or of the bending of the rim from normal position inasmuch as even though the rim might be accidentally bent and spokes broken the hub may be collapsed and the broken spokes removed and new ones inserted and upon expanding the hub member to tighten the spokes the wheel rim will be forced to assume its normal cylindrical position due to the uniform tension being placed upon the spokes.

Having thus briefly described my invention, its utility and mode of operation, what I claim and desire to secure by Letters Patent of the United States is—

1. In a wire spoked wheel in combination with an axle having a spindle, of a rotatable sleeve having right and left hand screw threads, a two-part hub each part being provided with a flange for the spokes, one of the said parts being in threaded relation with the left hand threaded portion of the sleeve and the other of the said parts being in threaded relation with the right hand threaded portion of the sleeve, said rim having apertures and a peripheral groove and a spoke formed of a single piece headed at each end, the inner end being adopted to be passed through one of the apertures in the rim to engagement with its respective hub portion, the opposite end of the spoke seating in the groove of the rim, and means for locking the sleeve from rotation relative to the hub members.

2. In a wire spoked wheel, the combination with an axle, of a hub formed of two parts, a sleeve having right and left hand screw threads with which the hub members respectively are in threaded relation, said hub members having notched flanges, a series of spokes for each hub part each formed of a single piece and provided with an inner headed end, and a T head at the outer end, a rim having two circumferential grooves each having a series of apertures in the bottom, each series of spokes being adapted to be inserted through the apertures of the respective groove with the inner ends engaging the notches of the respective hub flange, and the T head seating in the groove permitting the same to rock therein on adjustment of the hub members.

3. The combination with an axle having a spindle, of a hub member having a flange at the inner end, the outer end of the said hub member being threaded, an internally threaded sleeve mounted thereon, said sleeve being externally threaded in a direction opposite to that of the internal threads, a second flanged hub member in threaded relation with the exterior of the sleeve, rotation of the sleeve causing movement of the said last named hub member longitudinally of the axis of rotation of the hub.

4. The combination with an axle having a spindle, of a hub member having a flange at the inner end and adapted to be secured to the spindle, the outer end of the hub member being threaded an internally threaded sleeve mounted thereon, the sleeve being externally threaded in a direction opposite to that of the internal threads, a second flanged hub member in threaded relation with the exterior of the sleeve, rotation of the sleeve increasing or decreasing the distance between the flanges of the hub members, a rim, and spokes extending from each hub member to the rim.

5. A wire spoked wheel comprising in combination with an axle having a spindle, of a two-part hub member mounted thereon, means for adjusting the hub members toward or from each other longitudinally of the axis of the hub, and means for locking the hub members in the set position, a rim member having apertures therein for spokes, a series of spokes each formed of a single piece headed at each end, the spokes being adapted for insertion through the respective aperture in the rim to engagement with the hub member, the rim having a seat for the outer end of the spoke of a character to permit the same to rock therein on movement of the hub members.

6. A wire spoked wheel comprising the combination with an axle having a spindle, of a hub member mounted thereon, said member being formed of two parts, means for adjusting the parts toward or from each other longitudinally of the axis of the hub, means for locking the said members, a rim member having apertures therein for spokes, a series of spokes each formed of a single piece headed at each end, the spokes being adapted for insertion through the respective aperture in the rim to detachable engagement with the respective hub member, the rim having a seat for the outer ends of the spokes of a character to permit the same to rock therein on movement of the hub member, and a second rim mounted on the first rim covering the said spoke end and seats therefor.

7. A wire spoked wheel comprising in combination with an axle having a spindle, of a two-part hub member mounted thereon, said members each being flanged for the attachment of the spokes thereto, means for adjusting the parts toward or from each other, and means for locking the parts in adjusted position, a rim member having a circumferential groove and apertures in the bottom of the groove for spokes, a series of spokes for each hub member, each spoke being formed of a single piece headed at each end and adapted for insertion through an aperture in the rim to detachable engagement with the respective hub member, the opposite end of the spoke having a cylindrical head portion lying in the groove, the construction permitting the said head to rock therein on adjustment of the hub members.

8. A wire spoked wheel comprising in combination with an axle having a spindle, of a two-part hub member mounted thereon, said members each being flanged for the attachment of the spokes thereto, means for adjusting the parts toward or from each other, and means for locking the parts in adjusted position, a rim member having a circumferential groove and apertures in the bottom of the groove for spokes, a series of spokes for each hub member, each spoke being formed of a single piece headed at each end and adapted for insertion through an aperture in the rim to detachable engagement with the respective hub member, the opposite end of the spoke having a cylindrical head portion lying in the groove, the construction permitting the said head to rock therein on adjustment of the hub members and a second detachable rim member mounted on the first rim and covering the groove and spoke ends.

9. A wire spoked wheel comprising the combination with an axle having a spindle, of a hub member formed of two parts adjustable toward or from each other longitudinally of the spindle, means for locking the parts in adjusted position, said hub members having similar notched flanges, a rim having a series of apertures therein and a series of spokes for each hub member, each spoke being formed of a single piece headed at each end and adapted for insertion through an aperture in the rim with the inner end engaging a notch of the respective hub member, the rim having a seat for the outer end of each spoke of a character to permit the same to rock therein on movement of the hub member and a second rim member detachably mounted on the first rim member covering and enclosing the spoke ends and seats, said second rim member being adapted to support a tire.

10. In a wheel, a hub member formed of two parts adjustable toward or from each other longitudinally of a common axis, each hub part having a spoke receiving flange, a rim having a series of apertures arranged circumferentially thereabout, a series of spokes for each hub member, each spoke having a headed inner end and provided with a T head at the outer end, said T head being provided with a shank of a diameter approximately equal to the diameter of the inner headed end, said spokes being adapted for insertion through the respective apertures to detachable engagement with the hub member with the T head lying parallel with the plane of the wheel, and a seat for the said head consisting of a peripheral groove provided in the rim permitting the head to rock on adjustment of the hub members.

In testimony whereof I sign this specification.

LYMAN M. COOPER.